United States Patent [19]

Decker et al.

[11] 4,114,766
[45] Sep. 19, 1978

[54] TREE CADDY

[76] Inventors: Bernard J. Decker, 3415 E. Livingston, Columbus, Ohio 43227; Frederick J. Schmitt, 5184 Blair Ave., Canal Winchester, Ohio 43110

[21] Appl. No.: 769,381

[22] Filed: Feb. 17, 1977

[51] Int. Cl.$^2$ ............................................. A01G 23/04
[52] U.S. Cl. ......................................... 214/3; 214/394
[58] Field of Search .................. 214/3, 394, 390, 396; 37/2 R

[56] References Cited

U.S. PATENT DOCUMENTS

| 986,390 | 3/1971 | Hill | 214/3 |
| 1,139,735 | 5/1915 | Spuhr | 214/3 X |

FOREIGN PATENT DOCUMENTS 2,604,401   8/1976   Fed. Rep. of Germany ............ 214/394

Primary Examiner—Albert J. Makay
Assistant Examiner—George F. Abraham

[57] ABSTRACT

A machine for lifting, transporting and transplanting trees hereinafter sometimes called a "Tree Caddy." The machine comprises a frame consisting of substantially horizontal members supported by wheels and supporting a plurality of (preferably three) upright members secured to the frame and normally extending substantially vertically upwards. Hangers are provided at the upper end of each of the upright members and winches or hoists are secured to the hangers. The roots of a tree which is to be raised from the earth, tilted, transported, and/or replanted is first "balled", that is to say that the roots together with suffient soil to protect them are shaped to form an approximate sphere or ball with the soil surrounding and protecting the roots. The "ball" is then wrapped with burlap or other similar material. It is then tied with chains or other appropriate tensile constituent such as wire, rope, etc. Lifting chains or other tensile components are adjustably secured at one end in the winches and at the other end to a part of a tying constituent secured to the ball of the roots. Thus the operation of any one or more of the winches will increase or decrease the effective length of the cooperating tensile component to raise or lower or tilt the tree for transportation and transplanting.

9 Claims, 8 Drawing Figures

TREE CADDY

BACKGROUND OF THE INVENTION

1. Field

The invention disclosed herein relates to a machine hereinafter often referred to as a "Tree Caddy" for lifting trees intact from the ground, and/or transporting and transplanting said trees. Such a device also is capable of transporting a tree from the place where it has been growing to any other desired location as for example, to a place where it is to be replanted. Finally such devices are capable of lowering the tree into the ground in its new location so that additional soil may be supplied to hold the tree firmly in the ground at the new location.

2. Prior Art

Many patents have been granted by the Patent Office directed to machines for tree handling, and specifically for the digging of trees and similar plants, lifting them from the ground, transporting them and/or replanting them. For example, the following patents were located in a preliminary search of Class 214, subclass 3 on the invention disclosed herein: U.S. Pat. Nos.

Ryder, 85,135
Halling, 569,042
Hill, 986,390
Spuhr, 1,139,735
Hoffer, 2,192,771
Wilmore, 2,198,690
Jeffrey, 2,208,262
Gwathmey, et al., 2,243,955
Eagleson, 2,245,853
Jeffrey, 2,264,571
Vogel, 2,313,604
Pearson, 2,545,241
Copelen, 2,614,705
Hawkins, 2,650,063
Kluckhohn, 2,770,076
Pearce, 2,977,716
Sigler, et al., 3,017,719
Whitcomb, 3,045,368
Sigler, et al., 3,161,989
Whitcomb, 3,163,944
Ulrich, 3,243,905
Pollock, 3,339,299
Korenek, 3,364,601
Pollock, 3,432,950

Many of the above cited patents related to large and expensive machines for digging and lifting the tree and supporting it by the blades used in the digging. Some relate to devices mounted on self propelled vehicles such as trucks. Some relate to devices merely for the removing trees (i.e. digging them). Others relate to devices merely for transporting. Many are devices that require several men to operate. In some of the devices, the whole frame is tilted in order to tilt the tree so that it may be transported. Other devices provide no means for tilting the tree and are therefore not practical because it may be necessary to transport the tree on a road having viaducts and underpasses.

Therefore, there is need for an inexpensive machine for handling trees which can be operated by one man to raise a selected tree from the earth, which can be secured to a truck, tractor, or other form of self propelled towing vehicle and transported over highways, under bridges and moved to a site at which the tree can be replanted at a selected site, and which, independently of the towing vehicle, can be operated by one man to lower the tree into a hole previously provided for the reception of the tree.

OBJECTS

One of the objects of this invention is to provide an improved tree carrying or handling machine hereinafter often referred to as a "Tree Caddy."

Another object of this invention is to provide an inexpensive tree handling machine operable by one man to raise a tree from the earth, to transport it over a highway to a selected site where it can be replanted, and to lower it into the ground at the selected site.

A further object of the invention is to provide a tree handling machine or "Tree Caddy" capable of being operated by one man to raise a balled tree from the earth, to tilt the tree for safe and unhindered travel, to position the tree at the selected site and lower it into the earth for most efficient replanting.

Further objects of the invention will be apparent from further description herein, from the drawings and from the claims hereof.

SUMMARY

The invention disclosed herein relates to a machine for handling trees hereinafter at times referred to as a "Tree Caddy." The "Tree Caddy" embodiment disclosed is uncomplicated, inexpensive, efficient, and can be operated by one man without great difficulty to lift, transport and replant a selected tree, although two or more men can work efficiently in the whole transplanting operation. It is useful for transplanting trees. The transplanting operation requires raising a "balled" tree from the ground, transporting said tree to a selected place and/or lowering the tree correctly into a hole previously formed at such selected place so that the tree may be replanted efficiently in said hole.

The embodiments of the invention each comprise a frame, an undercarriage supporting the frame, a plurality of upright members extending upwards from the frame, hangers at the upper ends of the upright members, winches, secured to the hangers and chains or other tensile components operatively connected to the winches for raising, supporting, and manipulating the tree being handled. The frame is a substantially flat frame. The several members of the frame are normally positioned horizontally and are shaped to substantially encircle the trunk of the tree or the ball of the roots thereof whether the tree is positioned substantially vertically or is inclined or tilted. The undercarriage comprises a plurality of wheels (preferably four) and axles and supports the frame. There may be two or more upright members mounted to extend upwards from the frame. We greatly prefer three so that the tree may be easily lifted and then tilted to the desired position. If three are used, two of the three are preferably aligned transversely of the frame substantially over but slightly forward of the rear axle. A third should be positioned forward or rearward of the two aligned upright members, an appreciable distance along a line at right angles to the line connecting the two first mentioned aligned upright members. Thus if the chains of the two aligned members are kept substantially equal and if the other chain is made either shorter or longer, the tree can be tilted either forward or rearwardly along the center line of the "Tree Caddy" (i.e. along a line extending longitudinally of the frame). The hangers at the upper ends of the longitudinal members may be formed with the upright members or may be separately formed. If separately formed, they must be securely fastened, inasmuch as each of these hangers is arranged to support a substantial weight. The winches may be of any desired standard construction, but we have used a CM Puller Model B Lever Operated Hoists supplied by CM Hoist Division of Columbus — McKinnon Corporation, Tonawanda, N.Y. 14150.

In the embodiment shown herein the two aligned upright members are located substantially vertically above the common axis of the two rear wheels. Actually they are vertically above a line parallel with said common axis but positioned a few inches forward of said common axis. Thus substantially all of the weight is supported by the two rear wheels so that there is little tendency to bow the non-aligned upright member, but nevertheless there is no force tending to lift the front end of the carriage from the ground or other support.

BRIEF DESCRIPTION OF THE DRAWINGS

The drawings illutrating one embodiment of our invention consist of the following.

DETAILED DESCRIPTION OF THE PREFERRED EMBODIMENT

Figure 1:
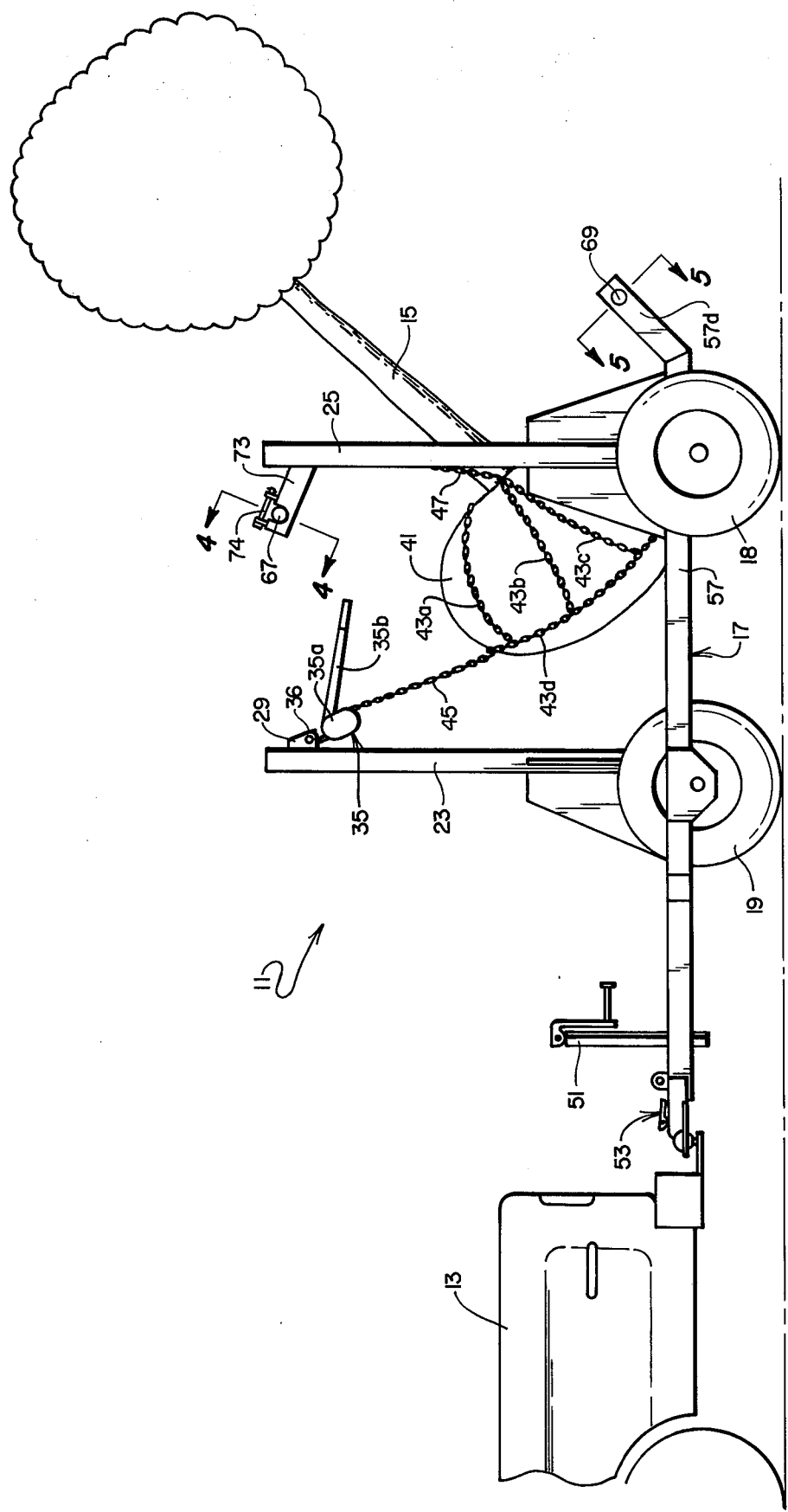
FIG. 1 is a view in side elevation of an embodiment of our "Tree Caddy" showing a tree being supported by the machine in a position tilted to the rear for safe and practical transportation on the highway and showing the "Tree Caddy" being connected to the rear end of a truck of which parts have been broken away for convenience of illustrations.
Figures 2, 3:
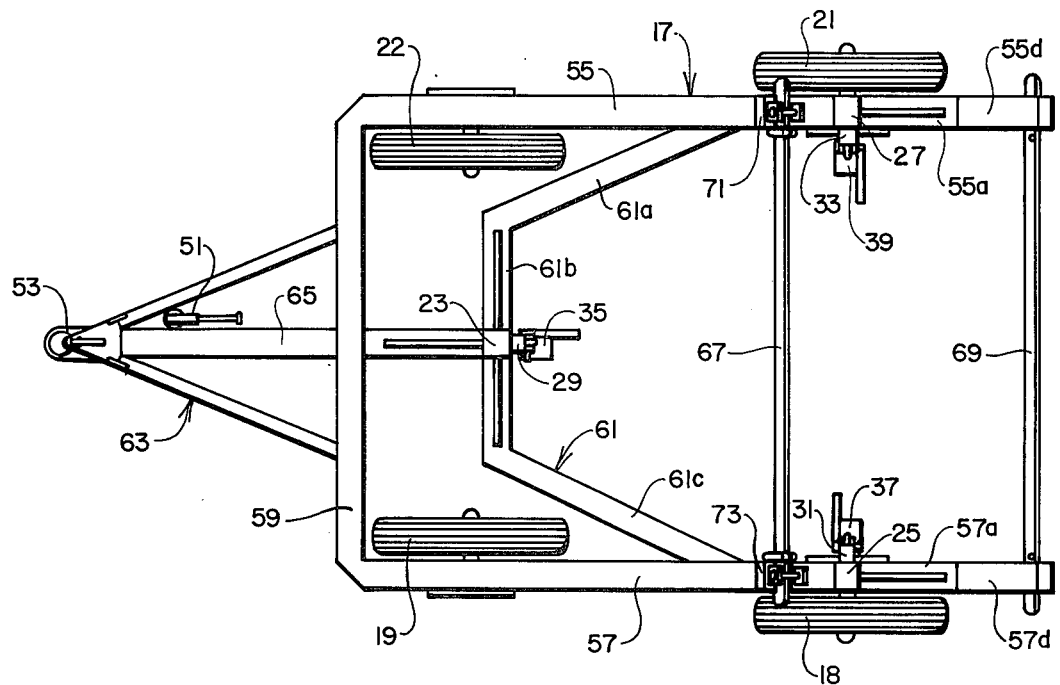
FIG. 2 is a view in top plan of the "Tree Caddy" of FIG. 1 without the tree.
FIG. 3 is a view in rear elevation of the "Tree Caddy" of FIGS. 1 and 2.

In FIG. 1 we have shown our tree handling machine which we call a "Tree Caddy" and which is generally designated 11. It is connected at its front end to the rear end of a towing vehicle shown as a truck 13, (but only a fragment of the truck is shown). The "Tree Caddy" supports a tree 15. It has a frame 17 which is supported by four wheels, two of which are designated 18 and 19 and are shown in FIG. 1. The other two wheels are designated 21 and 22 and are shown in FIGS. 2 and 3. There are three upright members 23, 25 and 27. Two of these (23 and 25) are shown in FIG. 1 and the third (designated 27) is shown in FIGS. 2 and 3. Secured near the top of the upright members 23, 25 and 27 are hangers 29, 31 and 33, only 29 being shown in FIG. 1, but all being shown in FIG. 3. We provide winches or hoists such as 35 (secured to hanger 29), 37 (secured to hanger 31), and 39 (secured to hanger 33). The winches 35, 37 and 39 are all shown in FIG. 3, but only 35 and are indicated in FIG. 1.

Figure 8:
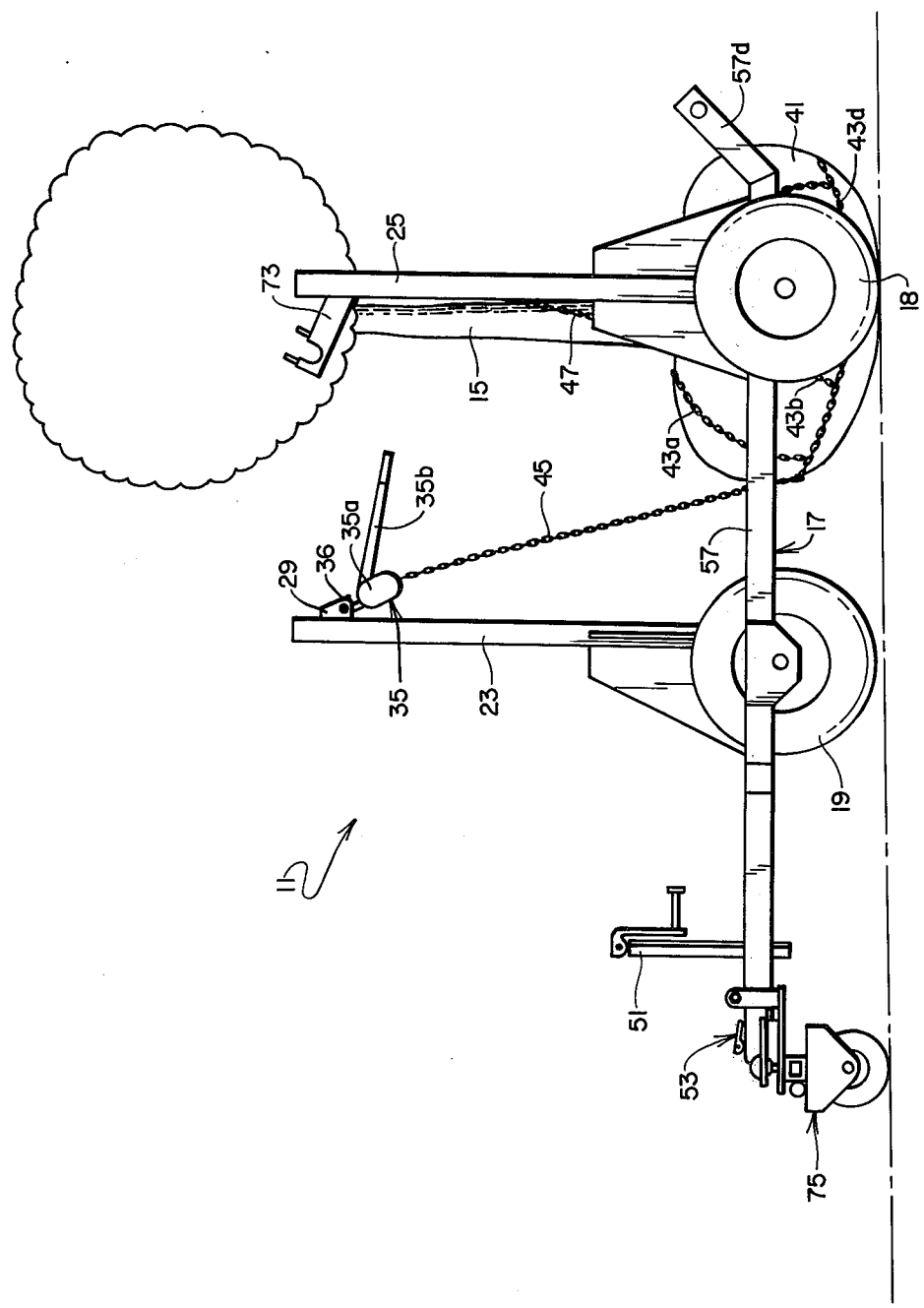
FIG. 8 is a view in side elevation similar to the showing in FIG. 1 but showing a tree removed from the earth where it had been growing but now resting on the ground away from the hole from which it has been lifted to illustrate a necessary step in the operation of handling some trees.

In FIG. 1 there is shown the "ball" 41 of the roots of the tree intermingled with the protecting soil. The roots and soil are covered with burlap or other suitable material and tied by tensile constituents such as chains, rope, wire, etc. In FIG. 1 are shown tensile components comprising chains designated 43a, 43b, 43c and 43d. Supporting tensile components such as chains 45, 47 and 49 are secured to the winches 35, 37 and 39 respectively, all being shown in FIG. 3, but only 45 and 47 being shown in FIG. 1. A jack 51 is shown in FIG. 1. This may be any suitable standard jack. A connector 53 is provided at the front end of the "Tree Caddy" 11 as shown in FIGS. 1, 8 and 12. This may be any standard trailer hitch. The jack 51 and the connector 53 will also be described in the description of the operation.

Referring specifically now to FIG. 2 for a more detailed description of the frame 17, it may be seen that it (the frame 17) comprises two side members 55 and 57, a front end member 59, an inner yoke 61, an outer yoke 63, and a draw bar 65. The inner yoke 61 has three sections 61a, 61b, and 61c. These sections may be separately formed and joined, but we prefer that the yoke 61 be unitary. The yoke 61 together with the rear end portion 55a and 57a of side members 55 and 57 form five sides of an approximate octagon. When a tree is supported or transported, the octagon partially surrounds the "ball" of the tree roots on five sides. The outer yoke 63 is formed like a V and the two legs of the yoke 63 are connected to the front end member 59. The rear end of draw bar 65 is adjustably connected to the section 61b of the inner yoke 61 at the rear end of the bar. The bar 65 is connected at its front end to the apex of outer yoke 63. The connector 53 is supported at the junction of the draw bar 65 and the apex of outer yoke 63.

The connector 53 is provided so that the "Tree Caddy" may alternatively be connected to a truck such as 13, or to a tractor or other type of towing vehicle or to a dolly such as 75 (shown in FIGS. 6 and 7) or to any other suitable means of pulling the "Tree Caddy". The dolly 75 is provided in order to move and manipulate the "Tree Caddy" solely by manual operation. The dolly 75 and tree connector 53 are shown on a larger scale in FIGS. 6 and 7 than the scale of FIGS. 1-3 inclusive.

Referring to FIG. 3 as well as FIG. 2, it may be seen that the upright members 23, 25 and 27 extend upward from and are supported by the frame 17. The winches 35, 37 and 39 are secured to and supported by the hangers 29, 31 and 33 and the hangers are in turn secured to and supported by the upright members 23, 25 and 27. The winches 35, 37 and 39 each consist of an upper hook, such as 36, a ratchet box or frame such as boxes 35a, 37a and 39a, a ratchet lever such as levers 35b, 37b and 39b, the supporting chains such as 45, 47 and 49 and a lower hook such as 35c, 37c and 39c.

Figure 4:
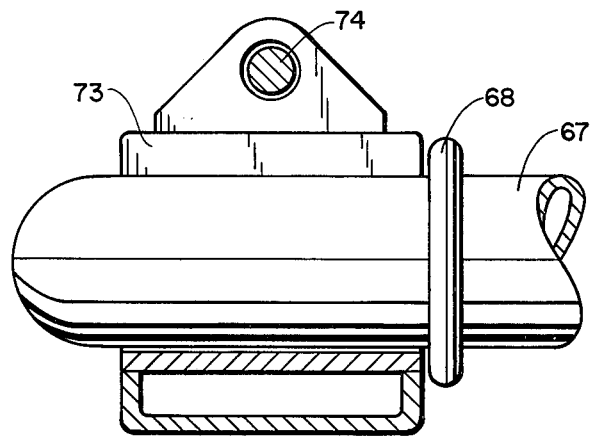
FIG. 4 is a view in section taken along the line 4—4 of FIG. 1 to illustrate further the removable connection of a cross brace extending between the hangers at the upper end of the aligned upwardly extending member.
Figure 5:
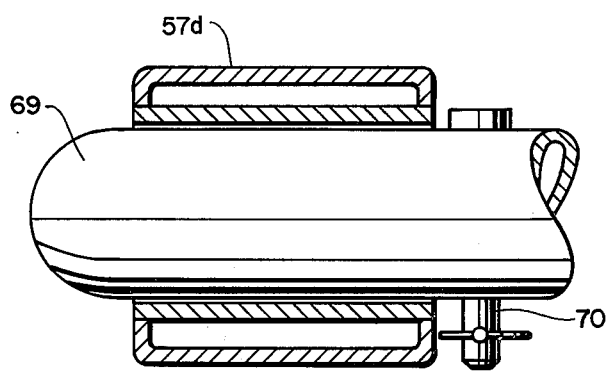
FIG. 5 is a view in section taken along the line 5—5 of FIG. 1 to show further the removable connection of a cross brace which stabilizes the wheel axles.

Stabilizer pipes or bars 67 and 69 are provided (see especially FIGS. 2 and 3). These stabilizer pipes are removable when operation requires. As shown, stabilizer pipe 67 when installed extends between a pair of brackets 71 and 73 secured to the tops of upright members 27 and 25, respectively, in order to stabilize the upright members when the "Tree Caddy" is being moved. However if desired or required, stabilizer pipe 67 may be removed just prior to the time that the tree is being lifted or tilted. Stabilizer pipe 69 when installed extends between a pair of brackets 55d and 57d secured to the rear ends 55a and 57a of the side frame members 55 and 57 respectively to stabilize axles of wheels 21 and 18 and the wheels themselves respectively. This stabilizer pipe 69 must be removed prior to the time that the "Tree Caddy" is being moved to partially encircle the tree. The construction of one end of the stabilizer pipe 67 and its connection to the bracket 73 is illustrated in FIG. 4. As shown in FIGS. 1, 2, 3 and 4 the bolts 74 (one at each end of pipe 67) are removable and when removed the pipe 67 may be inserted or removed. A collar 68 is formed on stabilizer pipe 67 to bear against the bracket 73 and a similar collar at the opposite end bears on the bracket 71. The construction of stabilizer pipe 69 is shown in FIGS. 1, 2, 3, and 5. The pipe 69 slides in and out of holes formed in the brackets 55d and 57d. Pins such as 70 extend through the stabilizer pipe 69 to bear against the bracket 55d and 57d.

Figure 6:
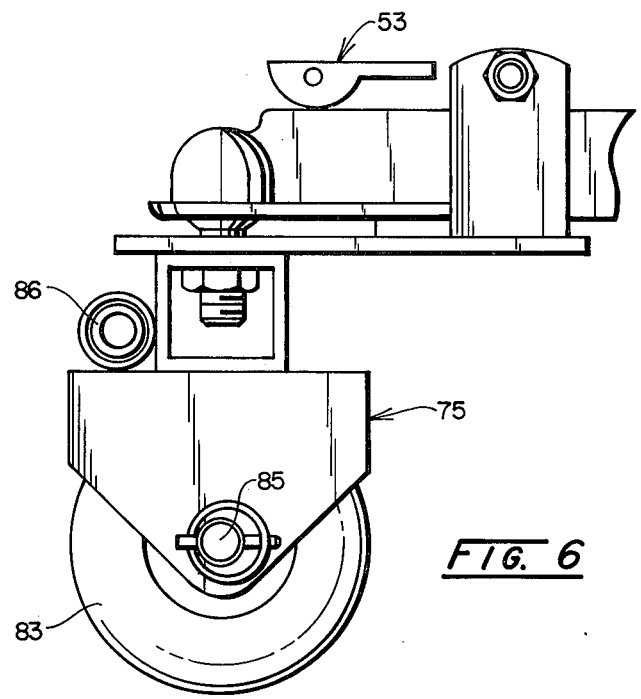
FIG. 6 is a view in side elevation of a dolly which may be connected to the front of our "Tree Caddy" instead of or in place of the towing vehicle so that the "Tree Caddy" may be steered when the machine is being moved manually without use of a towing vehicle.
Figure 7:
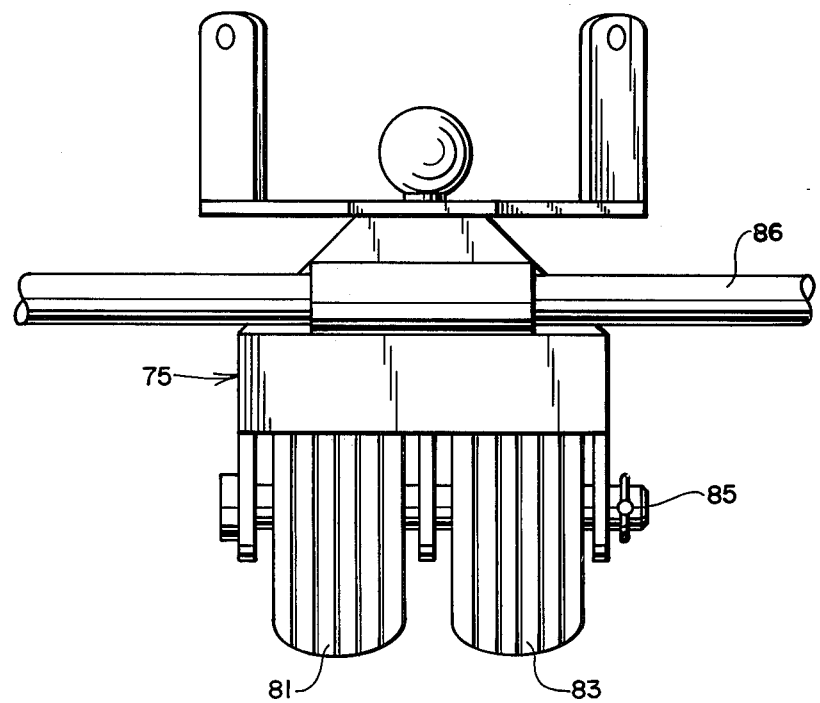
FIG. 7 is a view in front elevation of the dolly of FIG. 6.

A fifth wheel assembly or dolly is provided for hand or manual pulling or pushing of the "Tree Caddy" in a customer's yard in order to prevent damage to the yard. It is illustrated in FIGS. 6, 7, and 8 where it is designated 75 and is connected to the draw bar 65 and the apex of the outer yoke 63 by the connector 53. The "Tree Caddy" is, when desired, connected to the means for pulling the "Tree Caddy" as for example, only, a truck as shown in FIG. 1, in substantially the same manner as it is connected to the dolly as shown in FIG. 6 and 8. The dolly 75 is provided with ground wheels 81 and 83 and an axle 85. A bar 86 is provided for manually steering the dolly.

OPERATION

The operation of taking a tree from the ground where it is growing, transporting it to a new location and replanting it there with the use of our "Tree Caddy" 11 is as follows:

The earth around the sides of the roots of the tree is removed either by hand or by machine in such maner as not to injure the roots. The roots together with all of the earth or soil naturally co-mingled with the roots, are then "balled" in the well known manner of wrapping them with any suitable material (preferably burlap) to form a ball substantially in the approximate shape of a sphere. Then the ball is bound with any suitable tensile binding material but preferably with chains such as 43a, 43b, 43c and 43d.

The "Tree Caddy" 11 is normally prepared by (1) disconnecting it from any truck, tractor, or other means of locomotion or towing vehicle to which it has been connected; (2) possibly removing the dolly 75, if it has been connected; and (3) removing the stabilizer pipe 69. Normally stabilizer pipe 67 remains in place. The "Tree Caddy" is then moved so that it, to a great extent, encircles the tree and so that it straddles the opening in the ground created by removal of some of the earth around the tree. This is possible because of the removal of stabilizer pipe 69 which would interfere, if left in place, with the movement of the machine to partially encircle the tree. In so doing the frame members 55 (rear portion 55a) 61a, 61b, 61c, and 57 (rear portion 57a) substantially surround the trunk of the tree. The supporting tensile components (i.e. chains 45, 47 and 49) are secured to the tying tensile components (i.e. chains surrounding the ball 41) preferably and for example, to chain 43d and preferably at three spaced points around the circumference of the ball 41. Chains 47 and 49 are connected to chain 43d at points spaced approximately 180° apart around the circumference of the ball 41. The chain 45 is connected to chain 43d at a point approximately midway between the connections of chains 47 and 49 to chain 43d. The hooks 35c, 37c and 39c are used for making these connections. The winches (or hoists) 35, 37 and 39 are then operated by means of ratchet levers 35b, 37b, and 39b, operating all of the levers substantially equally so that the tree is lifted straight up, until it is well clear of the ground. However ratchet levers 37b and 39b do most of the work because most of the weight is on chains 47 and 49. Then one lever (as for example lever 35b) is operated to tilt the tree to the rear and the stabilizer pipe 69 is inserted and secured. The "Tree Caddy" 11 is then moved adjacent to a means of locomotion or pulling such as for example the truck 13 or a tractor. The front end and the front wheels 19 and 22 are raised by operation of the jack 51 and the apex of the outer yoke 63 and bar 65 are secured to the rear of the means of motivation by connection 53. The means of locomotion then pulls the "Tree Caddy" to a point near the place where the tree is to be replanted, passing over highways and streets if necessary. The means of motovation is then disconnected and the "Tree Caddy" moved manually. The dolly (fifth wheel assembly) 75 may be connected and utilized, or the tree may be moved on the wheels 18, 19, 21 and 22. If the "Tree Caddy" is connected to the dolly 75, the front of the Caddy and the wheels 19 and 22 are raised. At all times when the dolly 75 is being used the wheels 19 and 22 remain elevated above the ground. The stabilizer pipe 69 is removed. The Caddy is then moved manually to straddle the hole which has been prepared for the tree. One or two (preferably one) of the winches (as for example winch 35) is operated to return the tree to its vertical attitude.

The above description of operation is the usual operation. However, if the tree to be transplanted has bushy foliage so that the leaves or limbs might be injuring during the operation of raising and tilting the tree, the stabilizer pipe 67 is also disconnected at the same time that the stabilizer pipe 69 is disconnected. However when it is desired to reinsert the pipe 67, it is impossible to do so because the weight of the tree acting through chains 47 and 49 tends to bend the upright members 23 and 27 inward with such force that it is impossible to insert stabilizer pipe 67 between the two upright members. Therefore the "Tree Caddy" is manually pulled away from the hole from which the tree has been raised. Then the winches 35, 37 and 39 are operated to lower the ball to rest on the ground to the position shown in FIG. 8. If desired the tree could be tilted prior to lowering the tree to the ground so that the ball will rest at an angle. The weight is now released from the chains and the upright members may be moved apart so that the stabilizer pipe 67 may be inserted. It may be necessary to tilt the tree while it is resting on the ground in order to insert the pipe 67 without injuring the foliage. After the pipe 67 is inserted and fastened, the tree is raised and moved to the position shown in FIG. 1 by operation of the winches 35, 37 and 39. Then the tree is transported as described above to the site where the tree is to be transplanted. However, the stabilizer pipe 67 must be removed before the tree is tilted to the upright position to be lowered into the new location. Then all of the winches 35, 37 and 39 are operated evenly to lower the tree into the hole. Then the supporting chains 45, 47 and 49 are disconnected from the tying chains 43a, 43b, 43c and 43d surrounding the ball. Then the "Tree Caddy" 11 is pulled away manually.

Thereafter the tying chains 43a, 43b, 43c and 43d may be removed, additional earth is shovelled into the hole and watered and compacted, and the operation is completed.

It is to be understood that the above described specific embodiment of our invention is for the purpose of illustration only. It will be understood that certain features and subcombinations are all and each of utility alone and may be employed without reference to other features and subcombinations. This is contemplated and within the scope of the claims. As many possible embodiments of our invention other than the embodiment specifically illustrated and described herein may be made of the invention disclosed herein without departing from the scope of the invention, it is to be understood that all matters herein set forth or disclosed in the accompanying specification and drawings are to be interpreted in an illustrative and not in a limiting sense. Various changes may be made in the structure without departing from the scope of our invention.

The invention having been described and illustrated, what is claimed is:

1. A machine for use in transplanting trees comprising:
   (1) means, including a frame having a plurality of upright members secured to said machine for lifting a tree, after the tree has been severed from the earth, the roots of the tree and the soil embracing said roots has been balled and encircled with a tensile constituent;
   (2) means of transporting said tree to any selected site where a hole has been made for receipt of said tree; and
   (3) means of lowering the tree so that the tree and balled roots thereof are positioned correctly in said hole, wherein there is provided an undercarriage having a plurality of wheels by which the machine is supported; the frame consisting of a plurality of normally substantially horizontal members secured to and supported by said wheels; three upright members secured to the horizontal members and extending substantially vertically upwards and substantially parallel with each other and wherein a pair of said upright members are laterally spaced opposite to each other and wherein the third upright member is displaced longitudinally forward of said pair of laterally spaced upright members and is positioned laterally between said pair of upright members;
   hangers supported by the upper ends of each of the upright members;
   winches secured to each of the hangers;
   a plurality of tensile components capable of being secured to the tensile constituent of the balled roots and operably assembled with said winches so that the operation of each of the winches will increase or decrease the effective length of the associated tensile component to raise said tree while in an upright attitude, then to tilt, transport, and lower said tree.

2. The structure of claim 1 in which the frame includes five of the eight sides of an octagon.

3. The structure of claim 1 in which there are front wheels and rear wheels and the two laterally opposed upright members are supported by opposite longitudinally extending outer members of the frame at points substantially over the axles of the two rear wheels.

4. The structure of claim 3 in which the third substantially upright member is supported by a laterally extending frame member forward of the rear wheels at a point substantially equidistant from the other two upright members.

5. The structure of claim 3 in which there is provided removable means for preventing the lateral distortion of the two aligned substantially upright members.

6. The structure of claim 1 in which there are provided a pair of parallel rear wheels spaced apart substantially the width of said frame and a pair of parallel front wheels spaced apart a shorter distance than the width of said frame.

7. The structure of claim 1 in which there is provided means for attaching the front of the machine to a towing vehicle.

8. The structure of claim 1 in which a steerable dolly is provided in combination with said machine and means are provided for connecting the front of said machine to said dolly.

9. A machine for lifting balled trees vertically from the ground without tilting, for thereafter tilting said trees from the vertical and transporting them to a new location, for thereafter returning the trees to the vertical and lowering them vertically downward into a prepared hole and thus transplanting the trees comprising:
   a frame having three substantially vertically extending and substantially parallel members spaced from each other at their upper and lower ends;
   a hanger secured to each of the members adjacent the upper ends of the members and so positioned that straight lines connecting said three hangers form a triangle;
   winches secured to each of said hangers;
   a tensile member secured to each of said winches and each having means for securing the tensile member to the balled roots of a tree; and
   wheels upon which said frame is mounted.

* * * * *